I. LARSON.
COOKING UTENSIL.
APPLICATION FILED NOV. 1, 1911.
1,016,339.
Patented Feb. 6, 1912.
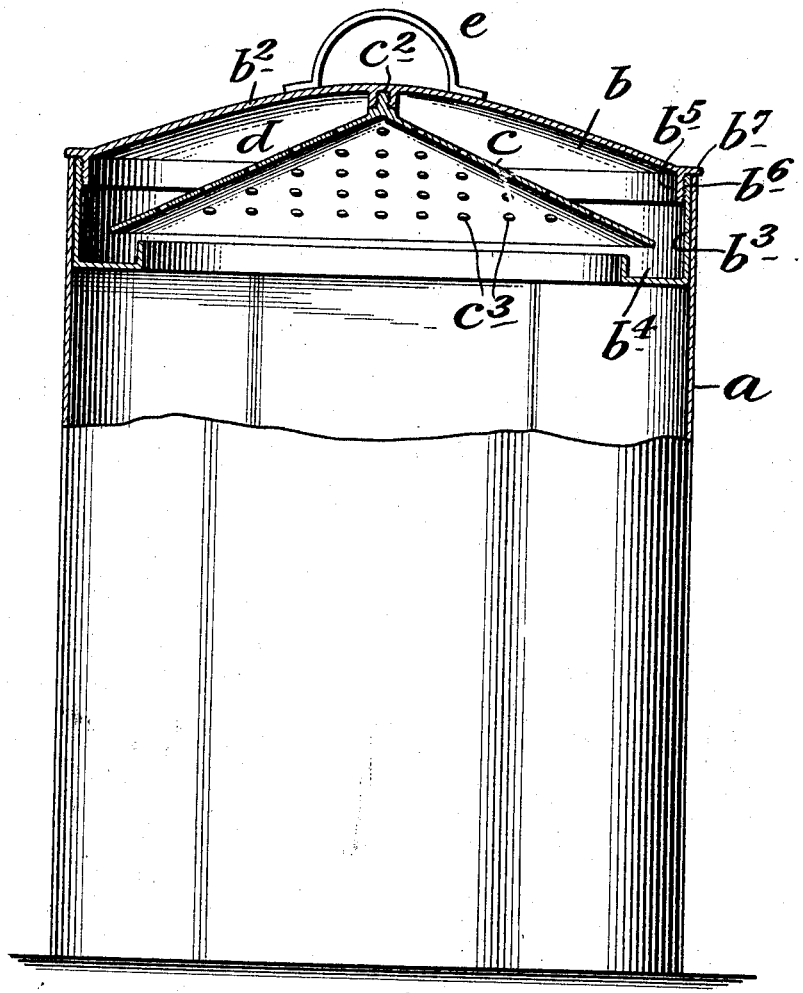
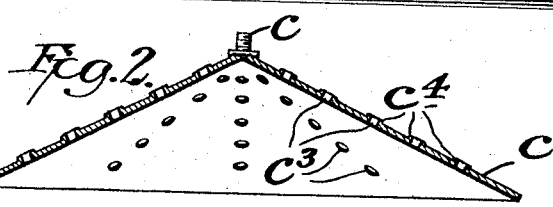

UNITED STATES PATENT OFFICE.

IDA LARSON, OF BROOKLYN, NEW YORK.

COOKING UTENSIL 1,016,339.　　　　Specification of Letters Patent.　　Patented Feb. 6, 1912.

Application filed November 1, 1911. Serial No. 657,929.

*To all whom it may concern:*

Be it known that I, IDA LARSON, a citizen of the United States, and residing at Brooklyn, in the county of Kings and State of New York, have invented certain new and useful Improvements in Cooking Utensils, of which the following is a specification, such as will enable those skilled in the art to which it appertains to make and use the same.

This invention relates to cooking utensils of the class known as boilers, stew-pans, frying pans and like articles, and the object thereof is to provide a cover for cooking utensils or vessels of this class which will prevent to an extent the escape of steam, vapor and odors from the vessel during the process of cooking and also the overflow of said vessel, and enable the contents to be more quickly cooked, and with these and other objects in view the invention consists in a device of the class specified, constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a side view of an ordinary boiler or like vessel provided with my improved cover, the top portion thereof and the cover being shown in section, and; Fig. 2 a view similar to Fig. 1, but showing only a detail of the cover in section, and showing a modification.

In the drawing forming part of this specification, I have shown at $a$ an ordinary boiler or vessel of the class used for cooking foods of various kinds, and in the practice of my invention I provide a closure device $b$ for said boiler, which comprises a cap $b^2$ provided with a depending skirt or rim portion $b^3$ the bottom of which is provided with or formed into an annular groove or receptacle $b^4$.

In practice, the cap $b^2$ is preferably provided with a depending rim member $b^5$ with which the skirt or rim portion $b^3$ is detachably connected by means of a screw threaded as shown at $b^6$, or this connection may be made in any desired manner. The cap $b^2$ is also provided, in the form of construction shown, with an annular flange $b^7$ which, when the cover is in position, rests on the top of the vessel $a$.

Within the cap $b^2$ is a conical attachment $c$ preferably made of sheet metal and attached to the central bottom portion of the cap $b^2$ as shown at $c^2$, this connection being preferably made by means of a threaded socket formed on or connected with the cap $b^2$ and a corresponding threaded pin formed on or connected with the attachment $c$ as shown in Fig. 1, but this connection may be made in any desired manner.

The conical attachment $c$ is perforated as shown at $c^3$ and forms a deflector through which the steam and vapor from the vessel $a$ passes, and in the operation of the device the said steam and vapor passing through the deflector $c$ is condensed in the space $d$ and flows back onto said deflector, and down thereover into the groove or receptacle $b^4$ from which, when said groove or receptacle is full, said condensation may flow back into the vessel.

The rim or skirt member $b^3$ is made of considerable depth and so made as to closely fit the top of the vessel $a$ and said skirt or rim member in connection with the flange $b^7$ of the closure device will, when said closure device is inserted into the top of the vessel, operate to almost entirely prevent the escape of steam, vapor, odors and the like from the vessel during the process of cooking and the overflow of said vessel or the discharge therefrom of liquid substances during said process, and the parts $b^3$ and $c$ may be disconnected for cleaning purposes whenever desired.

In forming the perforations $c^3$ in the conical attachment $c$ of the closure device $b$ the said perforations may be provided on the upper side or surface of said attachment with rims $c^4$ as shown in Fig. 2 which will prevent the condensation liquids from passing back through said perforations and compel the same to flow down into the annular groove or receptacle $b^4$, and the outer flange or rim of said conical attachment may be extended down into said annular groove or receptacle to form a seal if so desired.

In the use of this device the skirt or rim portion $b^3$ of the closure device fits tightly into the top of the vessel and said closure device is also provided with a handle $e$ whereby it may be manipulated or placed in position on the vessel and removed therefrom whenever desired.

Having fully described my invention, what I claim as new and desire to secure by Letters Patent, is:—

1. A closure device for cooking vessels, comprising a cap having a depending skirt or rim portion adapted to closely fit in the top of the vessel and provided at the bottom thereof with an inner annular receptacle which opens upwardly, and a perforated conical attachment secured within said cap centrally of the top thereof and the rim of which extends downwardly and outwardly over said receptacle.

2. A closure device for cooking vessels, comprising a cap having a detachable depending skirt or rim portion adapted to closely fit in the top of the vessel and provided at the bottom thereof with an inner annular receptacle which opens upwardly, and a perforated conical attachment detachably secured within said cap centrally of the top thereof and the rim of which extends downwardly and outwardly over said receptacle.

In testimony that I claim the foregoing as my invention I have signed my name in presence of the subscribing witnesses this 30th day of October 1911.

IDA LARSON.

Witnesses:
C. E. MULREANY,
FRANK G. AT LEE.